United States Patent
Bird et al.

(10) Patent No.: US 7,066,325 B2
(45) Date of Patent: Jun. 27, 2006

(54) STORAGE CONTAINER FOR RECORDED MEDIA

(75) Inventors: David A. Bird, Copley, OH (US); Michael S. Jaeb, Millersburg, OH (US)

(73) Assignee: Nexpak Corporation, Uniontown, OH (US)

(*) Notice: Subject to any disclaimer, the term of this patent is extended or adjusted under 35 U.S.C. 154(b) by 108 days.

(21) Appl. No.: 10/752,313

(22) Filed: Jan. 6, 2004

(65) Prior Publication Data

US 2004/0195123 A1 Oct. 7, 2004

Related U.S. Application Data

(60) Provisional application No. 60/438,605, filed on Jan. 7, 2003.

(51) Int. Cl.
*B65D 85/57* (2006.01)

(52) U.S. Cl. ............ 206/308.1; 206/303; 206/445; D6/407

(58) Field of Classification Search ......... 206/308.1 X, 206/309–313, 303 X, 493, 308.3, 308.2, 206/472, 815, 445 X; D6/407, 629
See application file for complete search history.

(56) References Cited

U.S. PATENT DOCUMENTS

| | | | |
|---|---|---|---|
| 5,477,960 A * | 12/1995 | Chen ..................... 206/308.1 |
| 5,727,681 A * | 3/1998 | Li ........................... 206/308.1 |
| 5,743,390 A | 4/1998 | Pozzoli |
| 5,775,500 A * | 7/1998 | Williams ................. 206/387.1 |
| 5,782,348 A | 7/1998 | Burdett |
| 5,845,771 A * | 12/1998 | Fu ........................... 206/308.1 |
| 5,975,298 A * | 11/1999 | Sankey et al. ......... 206/387.13 |
| 5,996,788 A | 12/1999 | Byrne |
| 6,053,311 A | 4/2000 | Grobecker |
| 6,554,132 B1 * | 4/2003 | Lau ........................... 206/303 |
| 6,626,290 B1 * | 9/2003 | Byrne et al. ............ 206/308.1 |
| 2002/0014421 A1 | 2/2002 | Byrne |
| 2002/0112974 A1 | 8/2002 | Lau |

FOREIGN PATENT DOCUMENTS

| DE | 29602035 U | 9/1996 |
|---|---|---|
| GB | 2304690 A | 3/1997 |

* cited by examiner

*Primary Examiner*—Jila M. Mohandesi
(74) *Attorney, Agent, or Firm*—Zollinger & Burleson Ltd.

(57) ABSTRACT

A media storage container includes a back wall with base and lid pages hingedly connected to the back wall. The base page has a hub to hold a first item of recorded media. An internal page is connected to the hinge wall and has a hub on one surface thereof to hold a second item of recorded media and a hub on the other surface thereof to hold a third item of recorded media. The hub on the internal page facing the base page is offset from the base page hub so that each hub helps hold discs on the facing page. Likewise, the hubs on opposite sides of the internal page are offset for the same purpose where additional internal pages are included.

15 Claims, 8 Drawing Sheets

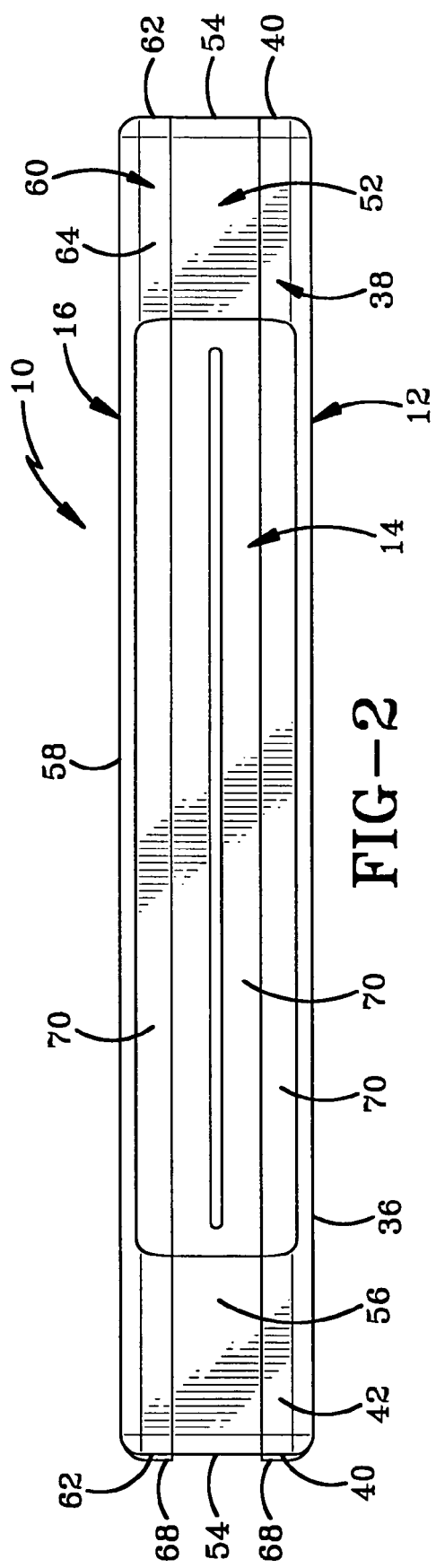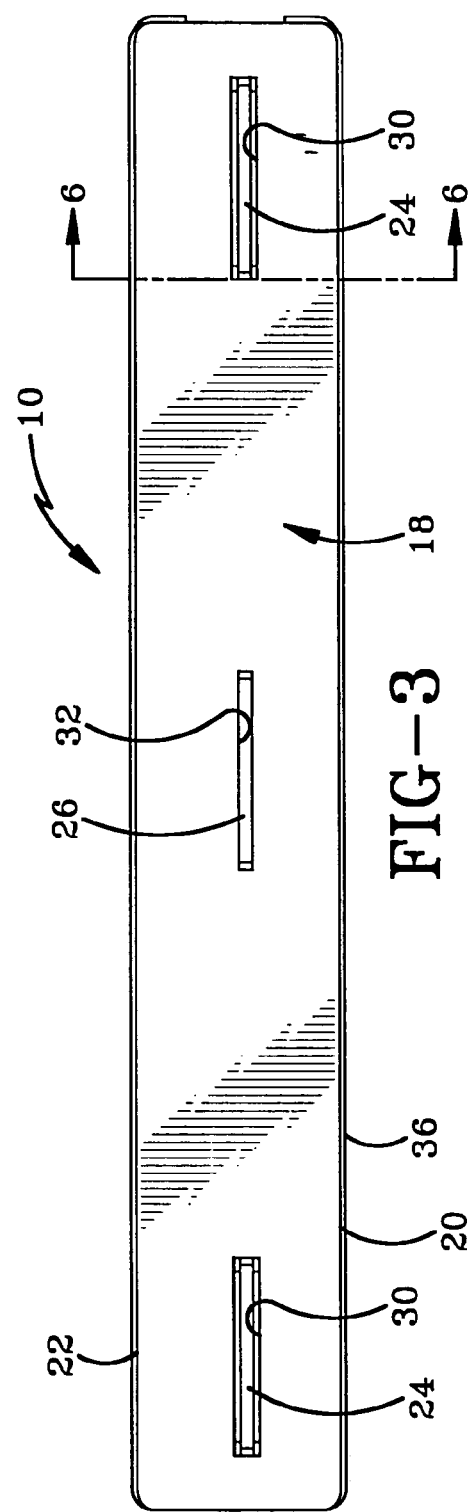

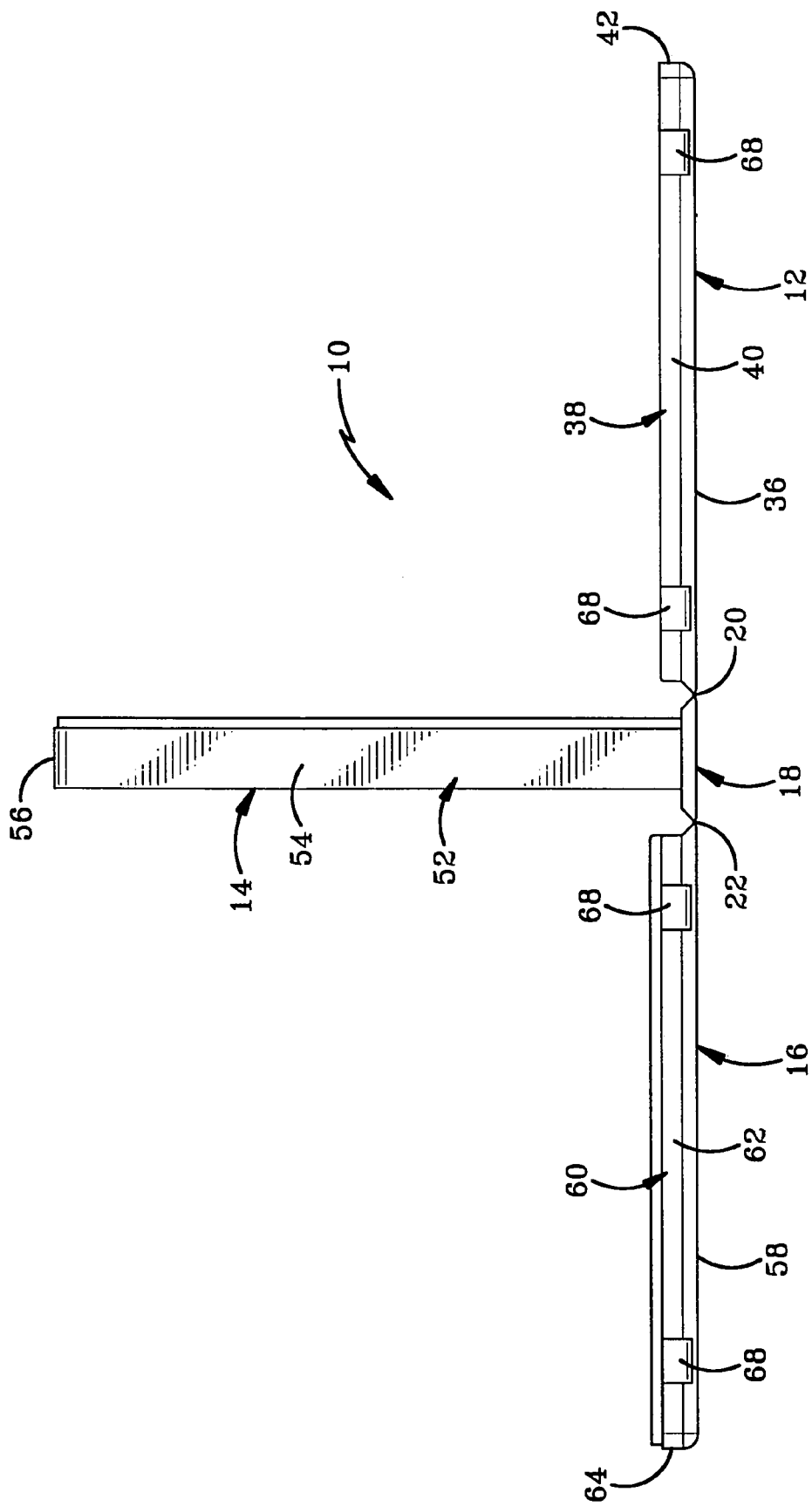

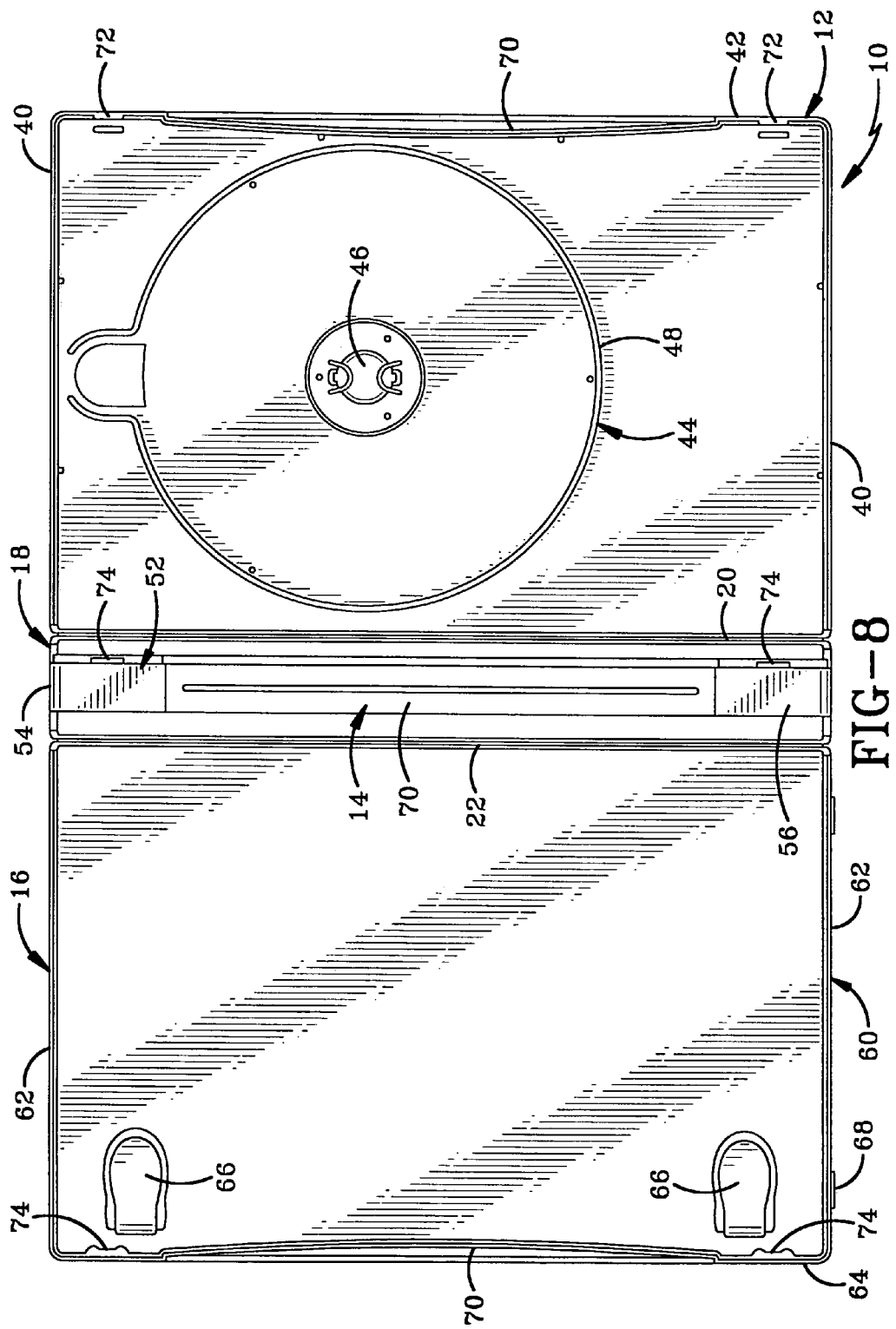

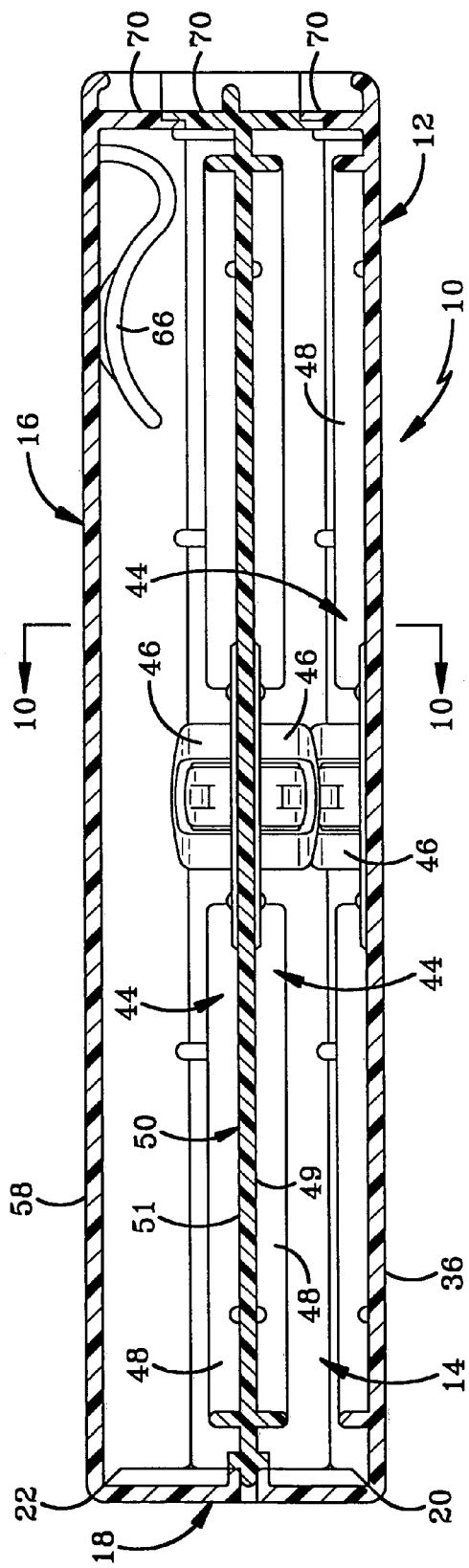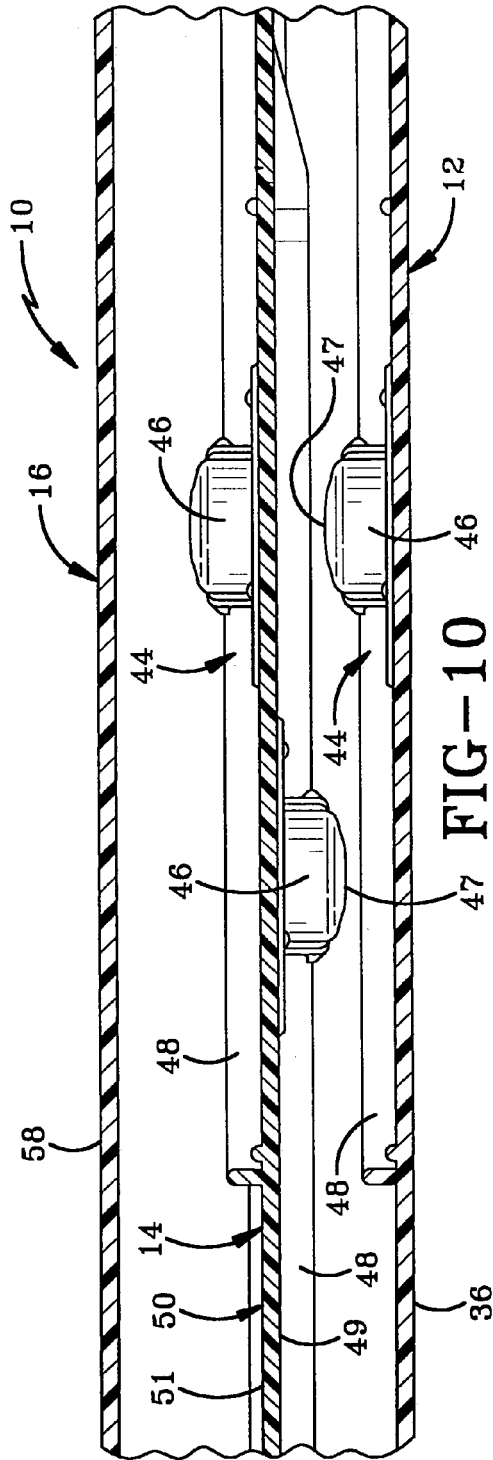

STORAGE CONTAINER FOR RECORDED MEDIA

This application claims the benefit of U.S. Provisional Application No. 60/438,605, filed Jan. 7, 2003, which is hereby incorporated herein by reference in its entirety.

BACKGROUND OF THE INVENTION

1. Technical Field

The present invention generally relates to storage containers for recorded media and, more particularly, a storage container system having components that allow the system to be selectively configured to hold different numbers of items of recorded media. Specifically, the present invention relates to a storage container for disc-shaped items of recorded media that includes pages that may be selectively snapped to a hinge structure to configure the container to hold different quantities of items.

2. Background Information

Movie and music collections are increasingly popular in today's marketplace. Such a collection typically includes multiple items of recorded media packaged together along with printed literature. The manufacturers of these collections desire storage containers that can hold all of the items of recorded media and literature together in a single package.

Such collections are being released on DVD, CD, VHS tapes, and cassette tapes. The art desires a container that can be selectively configured to hold different numbers of these items of recorded media depending on the content of the collection. The art also desires that the containers maintain a standard height and width so that the containers will fit in existing storage and display containers.

SUMMARY OF THE INVENTION

The present invention provides a media storage container that includes an internal page having two sides, each being adapted to hold an item of recorded media. The container also includes a lid page and a base page with the base page being adapted to hold an item of recorded media.

The invention also provides a storage container having pages with opposed offset hubs that cooperate together to hold discs in the container.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended claims.

FIG. 2 is a front elevational view of FIG. 1;

FIG. 3 is a rear elevational view of FIG. 1;

FIG. 7 is a side elevational view of the storage container of the present invention in an open position;

FIG. 8 is a top plan view of FIG. 7;

FIG. 9 is a sectional view taken on line 9—9 of FIG. 1; and

FIG. 10 is a sectional view taken on line 10—10 of FIG. 9.

Similar numbers refer to similar parts throughout the specification.

DESCRIPTION OF THE PREFERRED EMBODIMENTS

Figure 1:
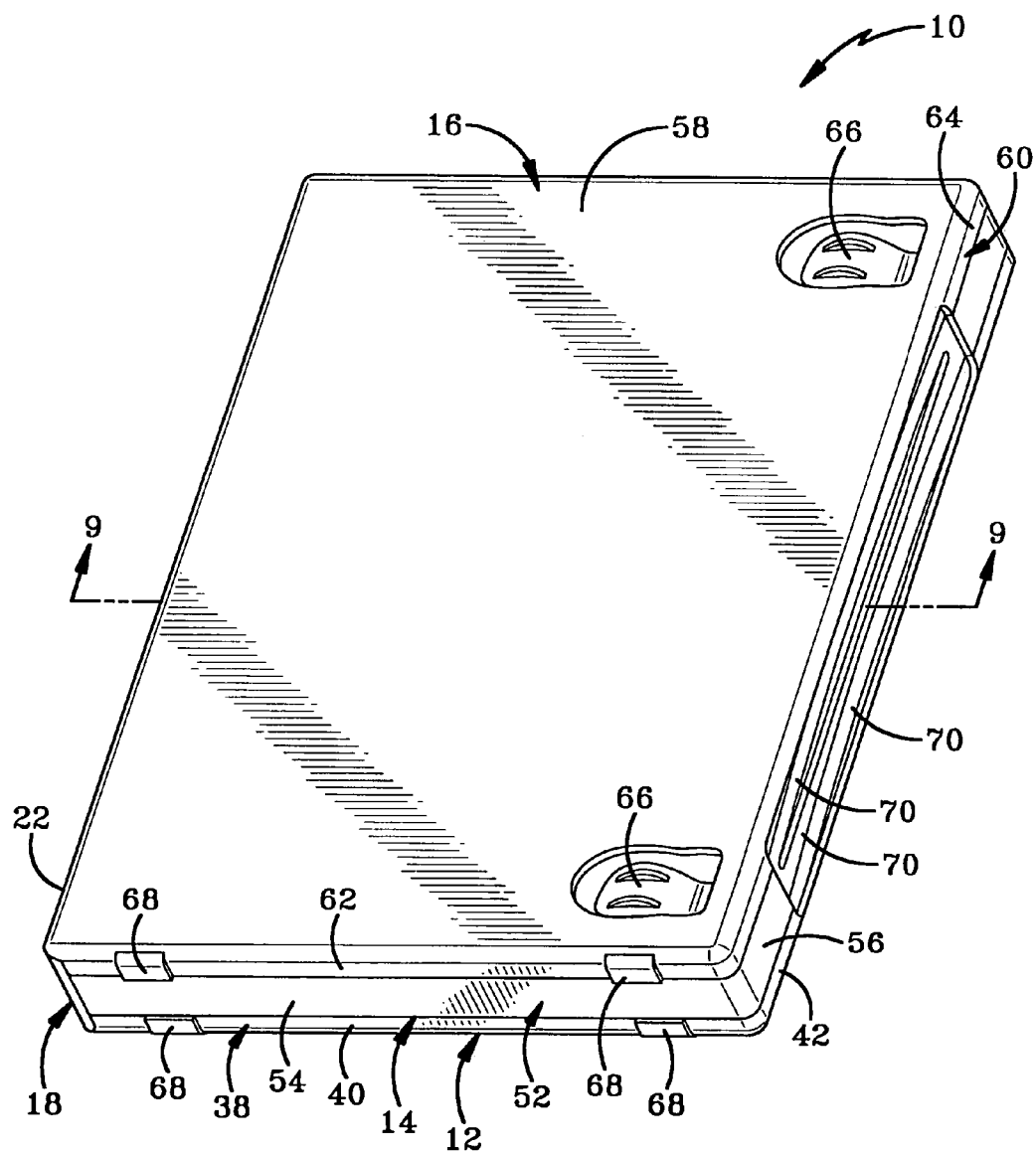
FIG. 1 is a perspective view of the storage container of the present invention wherein the storage container is configured to hold up to three items of recorded media.
Figure 4:
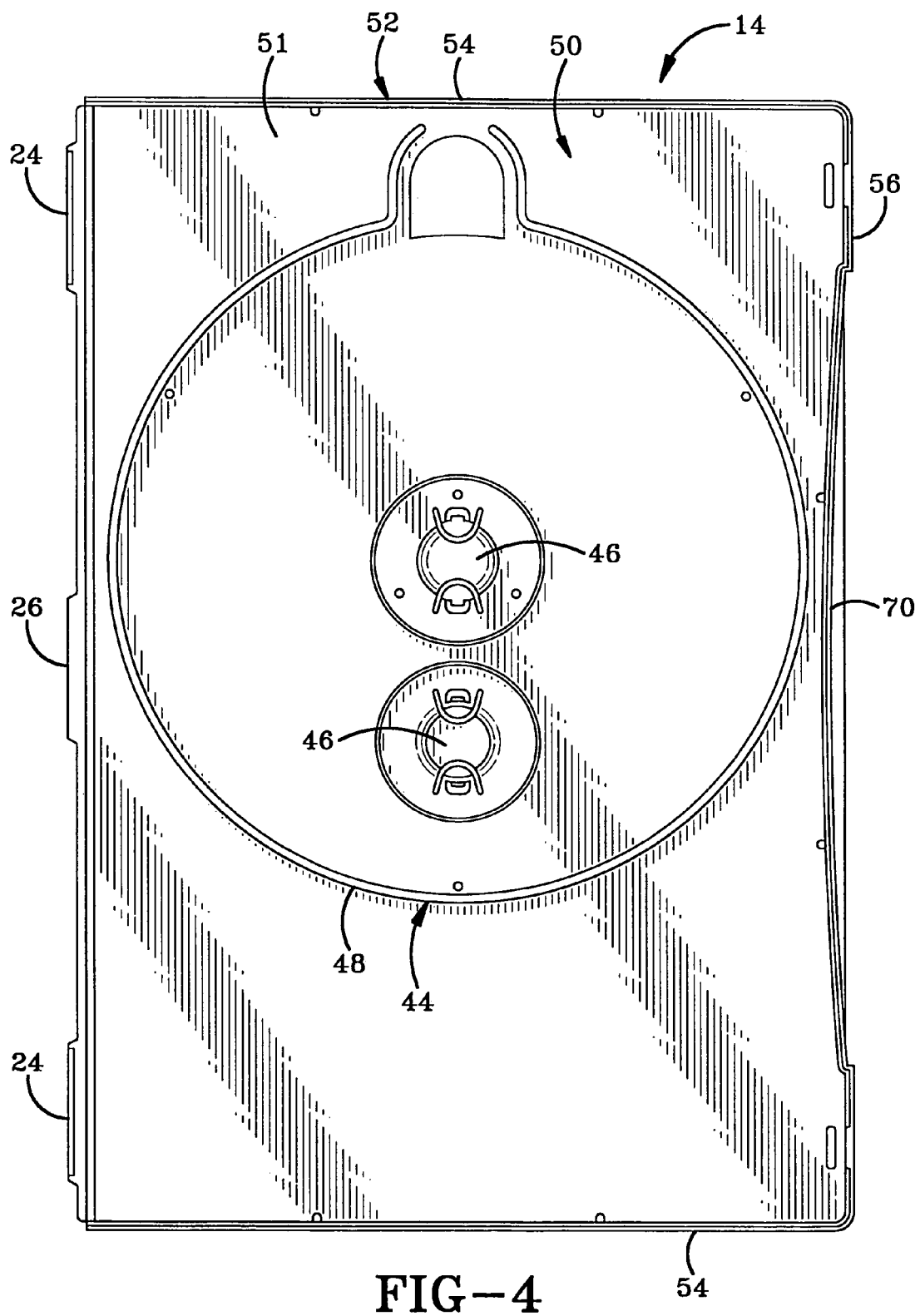
FIG. 4 is a top plan view of the internal page.
Figure 5:
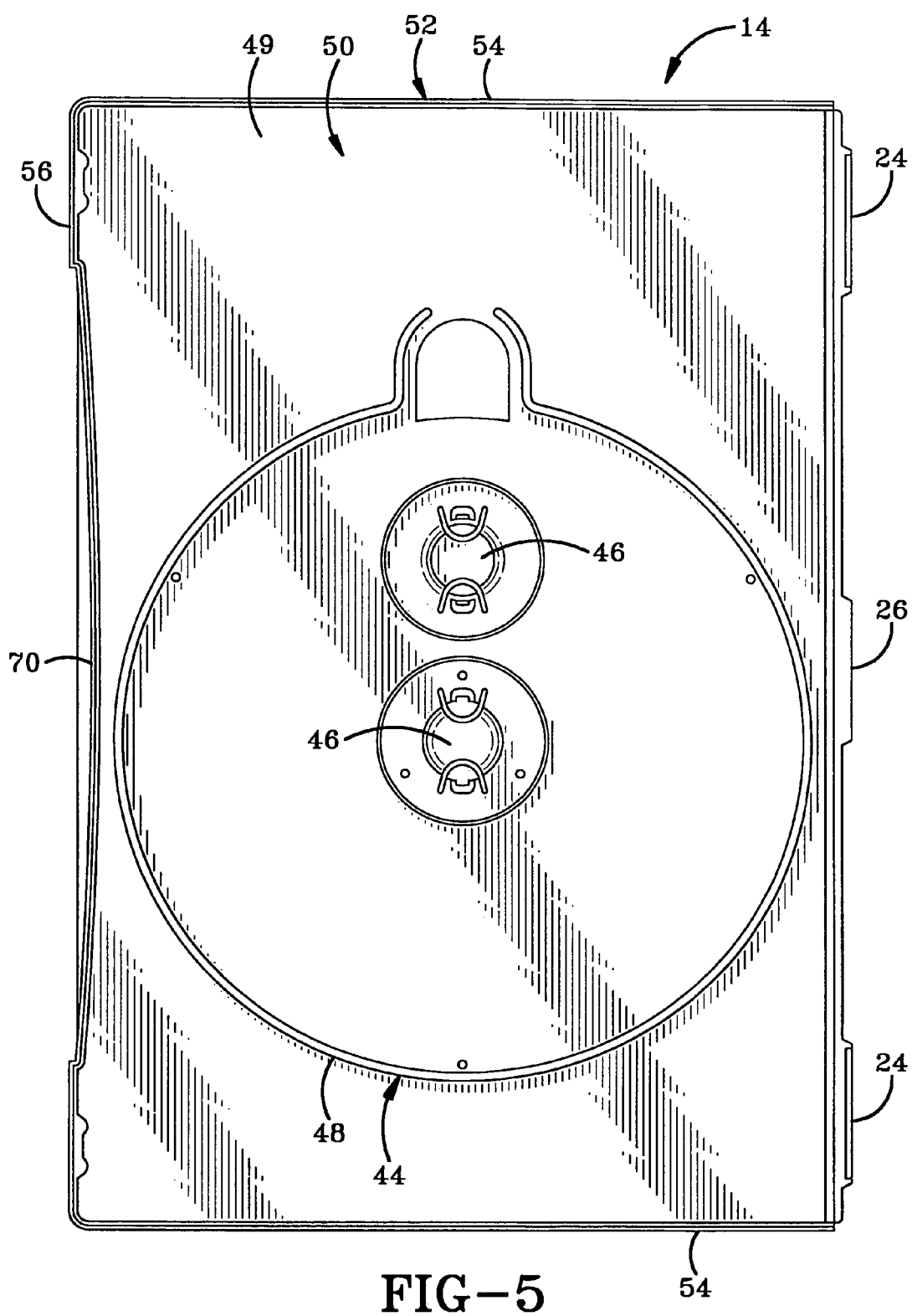
FIG. 5 is a bottom plan view of the internal page.

The storage container of the present invention is indicated generally by the numeral 10 in the accompanying drawings. Container 10 includes a base page 12, an internal page 14 and a lid page 16. Base page 12, internal page 14 and lid page 16 are held together by a back wall 18. Base page 12 is connected to back wall 18 by a living hinge 20. Lid page 16 is connected to back wall 18 by a second living hinge 22.

Internal page 14 may be selectively snapped into back wall 18 to add storage capacity to container 10. Each internal page 14 includes a pair of tabs 24 and a guide protuberance 26. In other embodiments of the invention, guide protuberance 26 may also be a snap tab or may be removed. Each snap tab 24 includes a pair of oppositely extending latches 28 (FIG. 6) that are configured to snap into tab slots 30 formed in back wall 18. Back wall 18 also defines a guide slot 32 configured to slidingly receive guide protuberance 26.

Figure 6:
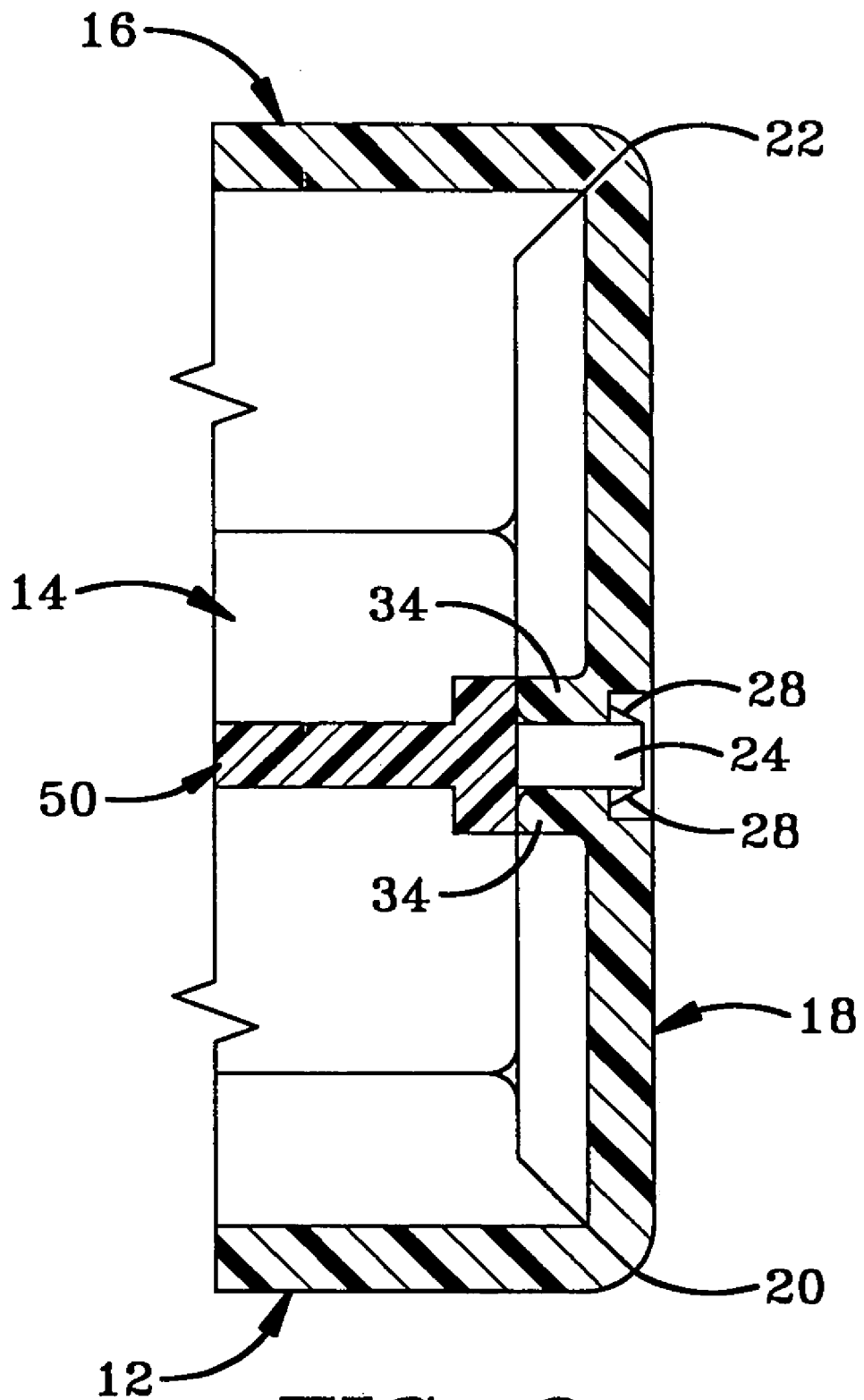
FIG. 6 is a fragmentary sectional view taken along line 6—6 of FIG. 3.

Back wall 18 may include a longitudinal channel formed by a pair of substantially parallel guide walls 34 that are disposed on either side of tab slots 30 and guide slots 32 (FIG. 6). Guide walls 34 and guide slots 32 provide extra rigidity to back wall 18 and help guide the insertion of page 14 into wall 18.

Base 12 generally includes a bottom wall 36 with a perimeter wall 38 extending around bottom wall 36 from hinge wall 18 to hinge wall 18. Perimeter wall 38 generally includes a pair of opposed sidewalls 40 and a front wall 42. The walls of base 12 are preferably integrally formed. A media holding arrangement is preferably integrally formed in bottom wall 36. In the embodiment of the invention depicted in the drawings, media holding arrangement 44 is in the form of a disc hub and surrounding wall having a finger access hole. This type of disc holding arrangement may be better understood by reviewing the disclosures of U.S. Pat. No. 5,996,788. In general, the disc snaps over the center portion or hub 46 of holding arrangement 44 with the outerwall 48 of holding arrangement 44 protecting the outer edge of the disc. Holding arrangements of this type are useful for holding CDs and DVDs. Other holding arrangements 44 may be used to hold computer game cartridges, cassette tapes, video cassettes, computer discs, and the like. Each hub 46 includes an upper wall 47.

Internal page 14 includes a base wall 50 and a perimeter wall 52 disposed along three sides of base wall 50. Perimeter wall 52 includes a pair of opposed sidewalls 54 and a front wall 56. Each base wall 50 has a pair of sides shown as first surface 49 and second surface 51 (FIGS. 4, 5, 9, 10). Each base wall 50 also includes a pair of media holding arrangements 44, as described above, projecting outwardly from respective surfaces 49 and 51 and formed integrally with page 14. This pair of arrangements 44 are offset from one another so that respective hubs 46 are offset from one another, as are respective outer walls 48. This pair of arrangements 44 are offset such that arrangement 44 projecting from surface 49 of page 14 is offset from arrangement 44 projecting from base page 12. (FIGS. 9, 10). The position of media holding arrangement 44 on second side 51 of internal page 14 is preferably the same with respect to hinge wall 18 as the position of arrangement 44 on base page 12 so that media holding arrangements 44 on base page 12 and second side 51 of page 14 are aligned when viewed from the top or bottom view as shown in FIGS. 9 and 10. In order to facilitate integral molding, the arrangement 44 on second surface 51 may be provided without outer wall 48 so that walls 48 do not overlap each other. This allows wall 48 to be molded on first surface 49 without interference from wall 48 on second surface 51.

Lid page 16 includes a base wall 58 and a perimeter wall 60 that extends about three sides of base wall 58. Perimeter wall 60 includes a pair of opposed sidewalls 62 and a front wall 64 that are preferably integrally formed with base wall 58. Lid page 16 includes literature holding clips 66.

The respective lower sidewalls 40 and 62 of base page 12 and lid page 16 include spaced apart feet 68 that help support container 10 when placed on end.

Front walls 42, 56, and 64 include cooperating concaved depressions 70 that form a common concave depression in the front wall of container 10.

The upper surface of base page 12 and internal page 14 include a first half of a latch 72 while the lower portion of internal page 14 as well as lid page 16 include a second half of a latch 74. Latch halves 72 and 74 cooperate to hold the pages together when they are closed with respect to each other. The position of latch halves 72 and 74 are consistent so that the pages may be interchanged and still latched together.

In the preferred embodiment of the invention depicted in the drawings, media holding arrangement 44 is offset on first surface 49 of internal page 14 compared to media holding arrangement 44 on base page 12 so that respective hubs 46 on first side 49 and base page 12 are not directly opposed when first side 49 is facing a base page 12 in the closed position. The offset is depicted in FIG. 10. Where a plurality of internal pages are used, the media holding arrangements are likewise offset on the first surfaces of the internal pages compared to the media holding arrangements on the second surface of the internal pages so that respective hubs 46 on the first and second surfaces of the internal pages are not directly opposed when a first surface of one internal page is facing the second surface of an adjacent internal page. The position of holding arrangement 44 on first surface 49 of internal page 14 allows the overall thickness of container 10 to be decreased and allows opposed hubs 46 to help each other hold discs on the hubs. In one embodiment, the upper walls 47 (FIG. 10) of opposed hubs 46 touch the opposed discs (not shown).

The elements and structures described above allow storage container 10 to hold three items of recorded media, one each on base page 12, first surface 49 and second surface 51 of internal page 14. If storage of four or five items of recorded media is required, container 10 can be configured to include additional slots 30, 32 in a wider hinge wall 18 and a corresponding internal page 14 may be accordingly connected to wall 18 at slots 30, 32. If such additional internal pages are used, the wider hinge wall may include additional living hinges (not shown) so that the hinge wall would flex between each adjacent pair of internal pages. This would allow container 10 to be open in a variety of configurations so that each side of the internal pages would be easily accessed.

The system described above allows the manufacturer to manufacture component parts and selectively configure them to hold different numbers of items of recorded media as desired by the retail market. The overall device is compact and maintains the same width and height dimensions as a standard single storage container for an item of recorded media. Only the thickness of the container changes as items of recorded media are added.

Accordingly, the improved storage container for recorded media apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the storage container for recorded media is constructed and used, the characteristics of the construction, and the advantageous new and useful results obtained; the new and useful structures, devices, elements, arrangements, parts, and combinations are set forth in the appended claims.

The invention claimed is:

1. A storage container for holding an item of recorded media; the media storage container comprising: a back wall; a base page having a hub adapted to hold a first item of recorded media; the base page hingedly connected to the back wall; a lid page hingedly connected to the back wall; and an internal page having a first surface and a second surface; the first surface having a hub adapted to hold a second item of recorded media and the second surface having a hub adapted to hold a third item of recorded media; the hub of the first surface of the internal page being offset from the hub of the base page; the hub of the first surface of the internal page being offset from the hub of the second surface of the internal page; the first and second surfaces of the internal page being opposed surfaces of a unitary body; the hub on the first surface of the internal page projecting in a first direction; the hub on the second surface of the internal page projecting in a second direction; and the first direction being opposite to the second direction.

2. The storage container of claim 1, wherein the hub of the first surface of the internal page is aligned with the hub of the second surface of the internal page in at least one direction.

3. A storage container for holding multiple media discs; the media storage container comprising:
   a page adapted to hold a pair of media discs disposed on opposite sides of the page;
   the page having a unitary base wall having oppositely facing first and second surfaces;
   a first disc-holding hub projecting from the first surface of the base wall and a second disc-holding hub projecting from the second surface of the base wall;
   the number of disc-holding hubs disposed on the page being no greater than two;
   the first and second hubs being laterally offset and spaced by a portion of the unitary base wall; and
   the hub on the first surface of the internal page projecting in a first direction; the hub on the second surface of the internal page projecting in a second direction; and the first direction being opposite to the second direction.

4. The storage container of claim 3, further comprising a front wall connected to the base wall of the page; the front wall having an outer surface that defines a concave depression.

5. The storage container of claim 3, wherein the base wall has four sides and further comprising a perimeter wall connected to three of the four sides of the base wall.

6. The storage container of claim 5, wherein the perimeter wall projects outwardly from both of the first and second surfaces of the base wall.

7. The storage container of claim 3, further comprising an outer wall surrounding each of the hubs; each of the outer walls adapted to protect the outer perimeter edge of a media disc that is disposed on the hub.

8. The storage container of claim 3, wherein the hubs are aligned in one direction.

9. A storage container for holding an item of recorded media; the media storage container comprising:
 a back wall;
 a base page having a hub adapted to hold a first disc-shaped item of recorded media; the base page hingedly connected to the back wall;
 the base page having a front wall having an outer surface that defines a concave recess;
 a lid page hingedly connected to the back wall;
 the lid page having a front wall having an outer surface that defines a concave recess;
 a unitary internal page having a base wall that defines oppositely facing first and second surfaces;
 the internal page having a front wall having an outer surface that defines a concave recess;
 the concave recesses of the three front walls cooperating to form a common concave recess when the lid and internal pages are closed with respect to the base page;
 the unitary internal page being connected to the back wall with a snap fit; the relative position of the unitary internal page being fixed with respect to the back wall such that the unitary internal page moves with the back wall;
 the first surface having a hub adapted to hold a second disc-shaped item of recorded media and the second surface having a hub adapted to hold a third disc-shaped item of recorded media; the hub of the first surface of the internal page being laterally offset from the hub of the base page; the hubs being aligned in one direction;
 the hub on the first surface of the internal page projecting in a first direction; the hub on the second surface of the internal page projecting in a second direction; and the first direction being opposite to the second direction;
 the number of disc-holding hubs disposed on the base page and internal page being no greater than three;
 an outer wall surrounding each of the hubs; each of the outer walls adapted to protect the outer perimeter edge of a media disc that is disposed on the hub; and
 when the lid and internal page are closed with respect to the base, the hub on the base page is aligned with both of the hubs on the internal page in a first direction and only one of the hubs of the internal page in a second direction perpendicular to the first direction.

10. The storage container of claim 9, wherein the base wall of the internal page has four sides and further comprising a perimeter wall connected to three of the four sides of the base wall; the perimeter wall including the front wall.

11. The storage container of claim 10, wherein the perimeter wall projects outwardly from both of the first and second surfaces of the base wall.

12. The storage container of claim 9, wherein the internal page is free of hollow spaces between its hubs.

13. The storage container of claim 9, wherein the hubs of the internal page are integrally formed with the base wall of the internal page.

14. The storage container of claim 3, wherein the internal page is free of hollow spaces between its hubs.

15. The storage container of claim 3, wherein the hubs of the internal page are integrally formed with the base wall of the internal page.

* * * * *